United States Patent [19]

Kamperman

[11] 4,405,462

[45] Sep. 20, 1983

[54] AUTOMATIC REVITALIZATION OF SULFIDE PROCESSING AND TREATMENT SOLUTIONS

[75] Inventor: David R. Kamperman, Harmony, Pa.

[73] Assignee: Lancy International, Inc., Zelienople, Pa.

[21] Appl. No.: 406,561

[22] Filed: Aug. 9, 1982

[51] Int. Cl.³ .............................................. C02B 1/20
[52] U.S. Cl. .................................. 210/709; 210/743; 210/746
[58] Field of Search ............... 210/702, 709, 716, 743, 210/746, 695

[56] References Cited

U.S. PATENT DOCUMENTS

| | | | |
|---|---|---|---|
| 4,102,784 | 7/1978 | Schlauch | 210/726 X |
| 4,278,539 | 7/1981 | Santhanam et al. | 210/726 X |
| 4,329,224 | 5/1982 | Kim | 210/709 |

Primary Examiner—John Adee
Attorney, Agent, or Firm—Parmelee, Miller, Welsh & Kratz

[57] ABSTRACT

A system and process has been devised for measuring and constantly maintaining a desired concentration of soluble sulfides in a processing solution for the purpose of fully maintaining its function. Sulfide regenerating solution is automatically introduced into the processing solution in an amount as constantly determined by concentration variations in the processing solution, to thus provide the processing solution with its most effective sulfide content. A constant take-off flow of processing solution is thoroughly mixed with a sulfide stabilizing solution flow to provide a tempered solution flow that is passed through a flow block having a sulfide measuring electrode and a reference electrode. Variable negative voltage generated on the sulfide electrode is sensed and compared with a substantially constant voltage generated on the reference electrode and is amplified in a controller assembly. The amplified energy is then employed to electrically control the introduction of a sulfide regenerating solution into the processing solution in accordance with a predetermined desired sulfide concentration thereof.

16 Claims, 4 Drawing Figures

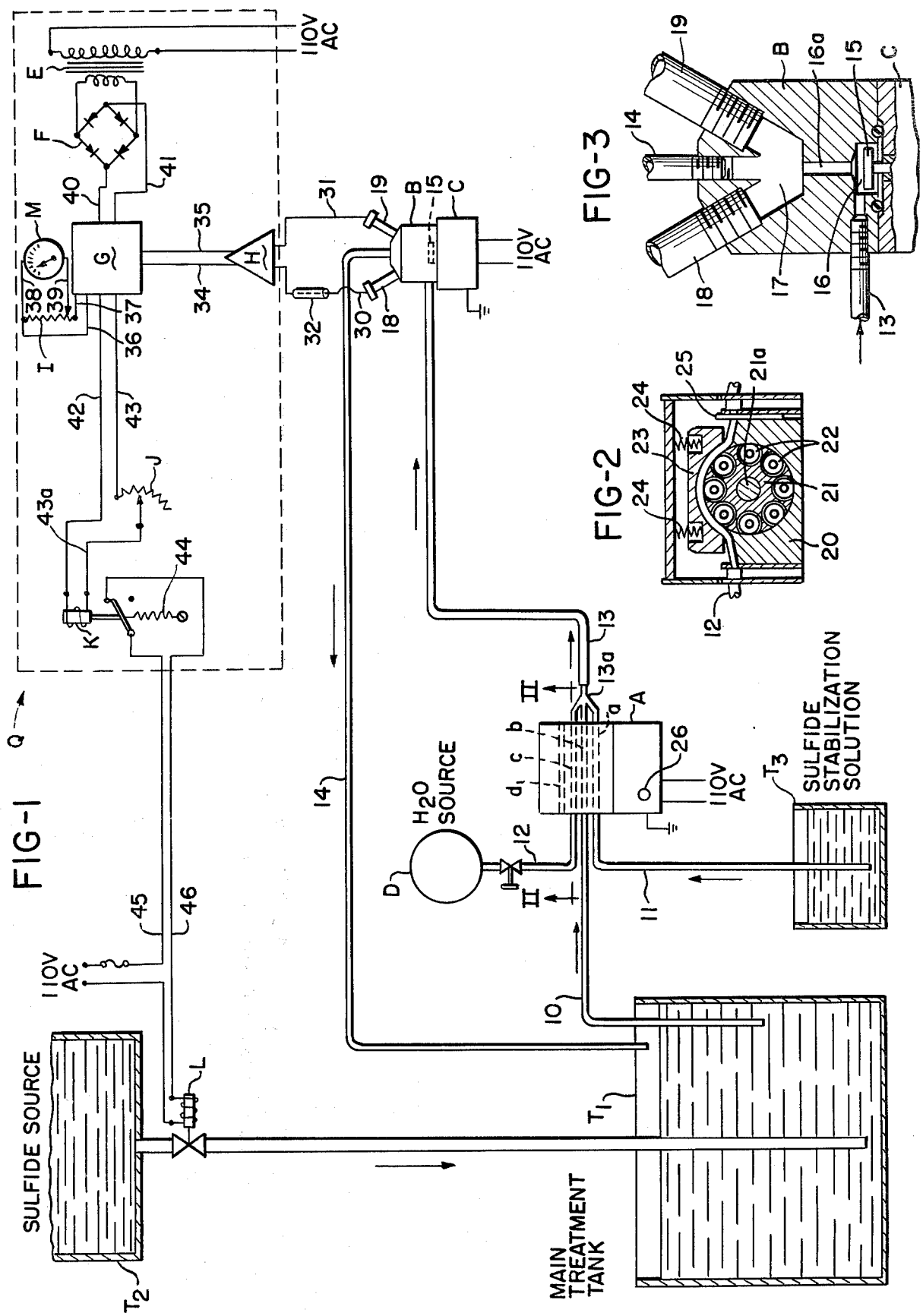

AUTOMATIC REVITALIZATION OF SULFIDE PROCESSING AND TREATMENT SOLUTIONS

This invention deals with an apparatus system and procedure for providing an accurate and reliable means of measuring soluble sulfide concentrations of and in controlling sulfide regenerating additions to sulfide processing solutions for maintaining their functioning effectiveness.

BACKGROUND OF THE INVENTION

It is well known that the addition of soluble sulfides, such as sodium sulfide, polysulfides, liquid sulphur, etc. is effective in removing many heavy metal contaminants from waste waters, effluents and certain process solutions. Such sulfide additions convert heavy metals to extremely insoluble metal sulfide precipitates that can be eventually removed from the contaminated water by settling or filtration or both. Sulfide precipitation is often the only effective method for removing heavy metal contaminants that are bound by complexing or chelating compounds.

For maximum effectiveness of sulfide additions for heavy metals removal, both the amount of sulfide used and the solution pH must be controlled. If, for example, too little sulfide is added or an inaccurate pH is employed, removal of the metal contaminants will be incomplete. Since sulfide, itself, is a contaminant and also for obvious economic reasons, overdosing must be kept to a minimum. Thus, it is highly desirable to have a reliable process or system to accurately measure and control pH and the amount of sulfide being added to the process. It is also important that the process or system be unaffected adversely by normal fluctuations in composition, temperature, ionic strength, pH, etc. that are normally encountered in industrial waters and effluents. Although accurate and reliable instrumentation is currently available for control of pH, no instrumental system or process is known to exist for measurement and control of soluble sulfide concentrations.

In an attempt to overcome the problem associated with and inherent in the lack of reliable sulfide control, a process was developed for heavy metals removal based on the use of the very slightly soluble compound, ferrous sulfide. This process is set forth in U.S. Pat. No. 3,740,331 and in EPA publication 625/8-80-003. It has been used to remove certain heavy metals by converting them to insoluble sulfides while, at the same time, maintaining very low levels of excess soluble sulfides in the process. However, the major deficiency of this approach is that it produces very large quantities or iron and metal sulfide sludges that must be disposed of as hazardous waste. An EPA report 600/S2-81-081 on the Characterization of Boliden's Sulfide-Line Precipitation System has also documented the importance of providing a reliable sulfide control and the lack thereof in the following statements: "The full-scale results of a typical run are shown in FIG. 4. $H_g$, Cu and Cd and Pb removals were complete by sulfide precipitation, whereas As and Zn separation was not adequate because of improper control of $Na_2S$ dosage and pH." And again: "The inadequate separations (by sulfide precipitation only) of As and Zn obtained in the full scale tests were due to the wide fluctuations of pH and sulfide dosage . . ."

Attempts have been made to use a soluble specific ion electrode immersed directly in solutions that require treatment with sulfide to control sulfide additions. EPA 600/2-80-139 on page 5, describes an attempt that has been made to use a sulfide specific ion electrode immersed directly in the solutions which require treatment with sulfides to control sulfide additions. It will be appreciated by those familiar with such electrodes that the signals generated are particularly affected by fluctuations in pH and ionic strength of the solution. Although the direct use of a sulfide ion electrode may work well in the laboratory under strictly or closely controlled and consistent conditions, it has been doomed to failure in industrial applications where conditions of pH and ionic strength constantly vary. ORP electrodes used in the control of sulfide are even more sensitive to changes in pH, ionic strength, as well as other variables.

There has thus been a real and definite need for an efficient and effective operating system and procedure to accomplish an accurate and reliable measurement and control of soluble sulfide concentrations that will be uneffected by changes in pH, ionic strength, temperature and other variables that are normally encountered in industrial waters and effluents.

OBJECTS OF THE INVENTION

It has thus been an object of the invention to solve the problem herein presented and to do so in a practical and efficient manner.

Another object has been to provide a control process and a system for utilizing it that will be substantially unaffected by changes in pH, ionic strength, temperature and other variables encountered in the use of a sulfide processing solution.

A further object of the invention has been to develop a positive process and effective apparatus system that will utilize take-off from a sulfide processing solution for automatically and accurately accomplishing a desired maintenance of revitalizing sulfide additions thereto to provide a substantially constantly maintained, predetermined maximum effectiveness of such solution.

These and other objects of the invention will appear to those skilled in the art from the described embodiment and the claims.

BRIEF DESCRIPTION OF THE DRAWINGS

In the drawings,

FIG. 1 is a schematic diagram illustrating a system employing the concept of the present invention; the dotted-in enclosed portion represents suitable elements of an amplifier-controller unit, such as a PR11 unit manufactured and sold by Dr. A. Kuntze, GmbH & Co. KG. of Düsseldorf, West Germany;

FIG. 2 is a vertical section through a suitable fluid pump, such as a synchronous, electrical motor driven, adjustable but constant speed pump, Model 371A sold by Sage Instruments Division of Orion Research, Inc. of Cambridge, Maine;

FIG. 3 is a vertical section through a flow block and motor driven magnetic mixer assembly, such as sold by ERC/Lancy of Zelienople, Pa.; the flow block is manufactured by ERC/Lancy and the mixer is a Magnetic Mini-Stir type distributed by VWR Scientific of Pittsburgh, Pa.;

Figure 4:
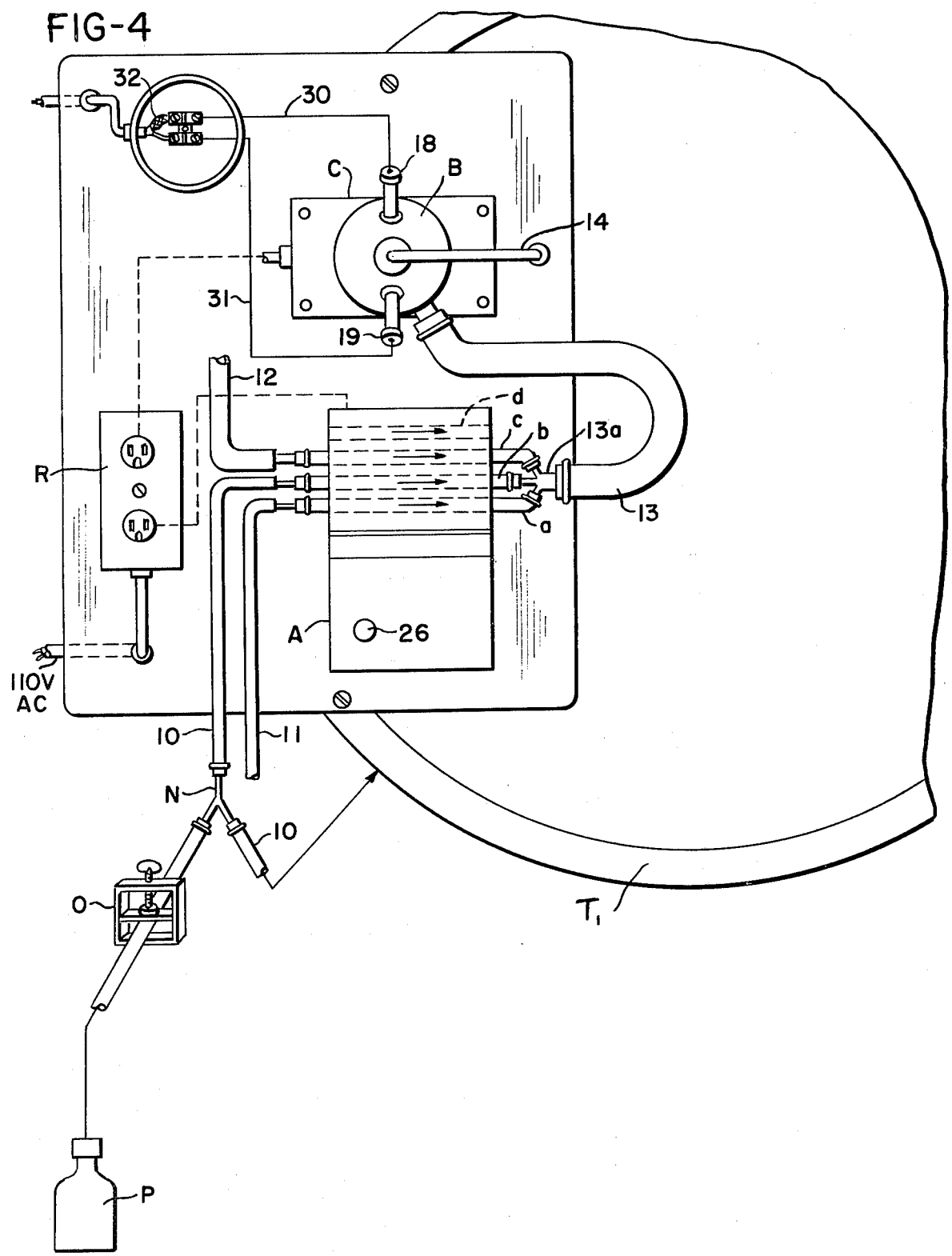

And, FIG. 4 is a top plan view illustrating a suitable base-mounted unit assembly of parts or elements of my system; it also shows a calibration set up.

DESCRIPTION OF THE INVENTION

This invention has been devised to meet a problem in the art dealing with the use of soluble sulfides that are employed in processing solutions and particularly, to meet the need for maintaining or automatically controlling the amount of sulfide in the solution to regenerate it during processing. The invention uses an apparatus assembly or system in a unique way to provide accurate and reliable means for measuring soluble sulfide concentrations in and for controlling concentration maintaining sulfide additions to waters and process baths.

A common use of the inventive system or procedure enables a control of low level sulfide concentrations, particularly in the field of waste treatment applications where sulfide concentrations of about 0.5 to 50 ppm are typical and, in accordance with the invention, which require no dilution water. However, provision has been made for diluting higher concentration containing solutions to also enable monitoring them. Other examples of employment of the invention are in treating sulfide solutions used to reduce the metal content of treated effluents, and for removing metals by sulfide precipitation from rinse waters, following chelate-containing processes, such as electroless copper and nickel plating, alkaline ammonia etching, and other surface cleaning solutions. Also, sulfide is often added to various batch treatment operations where maintenance of a specific amount of excess sulfide for a definite period of time is important. For example, batch dumps and blow downs from various metal-containing process solutions may be mixed together and treated as a batch. Such solutions often contain organic compounds that tend to hold heavy metals in solution, such that the addition of soluble sulfide may be employed to precipitate and remove the metals. Finally, sulfide is often added to a plant's total effluent to reduce its heavy metal content to acceptable discharge levels. This additional step may then be followed by flocculation and clarification or filtration to remove the precipitated metal sulfides. In all of the above examples, it is important to be able to control and monitor the sulfide levels to insure the best and most efficient treatment.

Referring to FIG. 1 of the drawings, I have shown a layout or system arrangement suitable for carrying out the principles of the invention. In this figure, $T_1$ represents a treatment tank whose solution is to be maintained at a substantially constant level of sulfide concentration during a full treatment process and fully continuously and automatically in accordance with the system or process of the invention. $T_2$ represents a sulfide tank containing a replenishing source of sulfide solution that is connected through a tubing, pipe or duct 15 to supply solution as needed to the tank $T_1$, and as controlled by a solenoid valve L. In employing the invention, a take-off tubing, conduit or pipe 10 is positioned to extend into the treatment tank $T_1$ to continually draw off therefrom and supply specimen solution that is given a suitable preliminary conditioning by mixing it with a substantially equal amount of stabilizing solution that is introduced through pipe or conduit 11 from a sulfide stabilizing tank $T_3$. The sulfide stabilization solution is employed to maintain a constant pH and ionic strength condition in the specimen liquid to thus eliminate the adverse effect of such variables.

If the concentration of the specimen taken from the tank T is above about 32 g/l, then the specimen solution should be diluted by the addition of water from a suitable source D, using piping 12. The purpose is to bring the specimen solution down to a concentration such that an accurate response may be accomplished by a sulfide ion electrode 18. In this connection, the response of the electrode 18 is only linear over a specific concentration range of $10^{-7}$ to 1 molar (0.0032 ppb to 32 g/l). Fluid liquid may be drawn off through conduit or pipe lines 10, 11 and 12 by a suitable pump A, such as an adjustable speed, synchronous, motor driven, peristaltic Sage pump. As shown in FIGS. 1 and 2, the pump A has a set of flexible compression tubes a, b, c and d on a common plane that are engaged by peripherally mounted idler rollers 22 that are carried on a synchronous motor-drive, cylindrical drum 21. The cylindrical drum 21 is secured on a motor drive shaft 21a and operates within a circular, upwardly open bore of a lower support block 20 and cooperates with a circular, bottom-open, upper pressure plate or head 23 that is flexibly carried by compression springs 24. An anti-siphon clip 25 is shown extending over the outlet end portions of the flexible tubes a, b, c and d of which only tubes a, b and c are to be connected for use; tube c is connected only if dilution water is required.

The flexible tubes a, b and c have a common outflow fork connector 13a such that fluid or liquid from all three enters a common tubing, pipe or conduit 13 to flow into a lower mixing chamber 16 in a flow block B. The flow block B is shown mounted on a magnetic mixer C whose resin cover vibrating plunger 15 is adapted to finalize the mixing operation within the flow block B. A relatively small amount of process fluid or liquid is continuously extracted and mixed with a quantity of stabilizing solution to maintain a constant pH and ionic strength in the flow and eliminate heretofore adverse effects of such variables. The rate of withdrawal of the solution through the lines 10 and 11 is preferably maintained at a constant value, for example, 100 m/l per hr. by means of pump A.

Since a greater quantity of water is necessary for dilution purposes over the above indicated maximum concentrations, a larger size conduit 12 is employed for introducing it into the pump A. By way of example, the tubing 10, 11 may be of a 1 mm ID size and the tubing 12 may be of 4 mm ID size. The pump A is adapted to simultaneously compress the three flexible, through-extending tubings a, b, c and its idler rollers 22 knead and compress the tubings between the lower support block 20 and the upper, flexibly positioned head or plate 23. As indicated in this figure, the upper head 23 is positioned in a cooperative circle defining a cavity relation with respect to the lower block 20.

The importance of a sulfide stabilization solution has been previously indicated and a typical solution may consist of about 7 g/l of ascorbic acid, 8 g/l of sodium hydroxide and about 0.1 ml/l of hydrazine hydrate of a 64% concentration. The concentrations of this solution are not critical and it has been found that they be varied by as much as about ±50%. In the stabilization solution, ascorbic acid is used to prevent any air oxidation of the sulfide, while sodium hydroxide is used to make sure that all the sulfide content of the solution is in the $S^=$ form. This is the sulfide form required to obtain a response from the sulfide electrode 18 of the flow block B. If not used, a stable reading cannot be achieved due to air oxidation of the sulfide as it travels from the processing tank $T_1$ through the pump A and into the flow block B. Also, if the pH of the sulfide is lowered below 12, any present will change from $S^=$ to $HS^-$ to $H_2S$ under acid conditions. This is objectionable, since the sulfide electrode only measures the S= form and this condition only exists at a high pH of 12 or greater. This is the reason for adding sodium hydroxide to make sure that the solution entering the flow block B has a pH of 12 or greater.

The two solution flows from lines a and b are thoroughly mixed by magnetic mixer C and then advanced upwardly by the pump A along vertical passageway 16a into electrode chamber 17 of the flow block B. The chamber 17 has a sulfide electrode 18 preferably a silver sulfide solid state type, such as type PHI 92100 sold by Graphic Controls Company, or Model No. 94-16, sold by Orion Research Incorporated. They are of a solid state type which work in a $10^0$ to $10^{-7}$ S= range and have about 1 megohms resistance. Reference electrode 19 may be a standard polymer, double junction, refillable PHE 55473 type, also sold by Graphic Controls Company. Incidentally, any suitable low volume, positive displacement pump A that provides a continuous, constant volume flow may be used. The flow block B provides an electrically non-conductive container for the chambers 16 and 17 and the electrodes 18 and 19. It may be of Lucite or an equivalent plastic or resin material. The solution leaves the chamber 17 through a central outlet tubing, pipe or conduit 14 to return to the processing tank $T_1$ for reuse therein.

An emf energy signal is generated on the sulfide electrode 18 that varies according to the sulfide ion concentration present in the mixed solution applied thereto. The energy signal of the electrode 18 will thus vary with the sulfide concentration of the through-flow and will be in negative, direct current millivolts. A comparison potential developed on the reference electrode 19 will have a substantially constant value, within a range of about 0.5 to 5 volts (depending on the internal solution used in the electrode). The electrode 18 is electrically connected through lead 30 and a shielded cable 32, and the electrode 19 is electrically connected through lead 31 to an amplifier H of a controller-amplifier assembly, such as a PR11 unit. The sulfide electrode 18 may have a silver sulfide crystal bonded into an epoxy body, such that when the crystal is contacted by the specimen solution containing sulfide ions, an electric potential develops there across. This potential depends upon the level of free sulfide in the solution and may be measured against a constant reference potential (of electrode 19) with a specific ion meter. The electrode 18 generates a negative voltage of about 28 millivolts for each tenfold change in sulfide ion concentration. Such voltages will vary over a range of about $-720$ to $-920$ millivolts. A circuit within the dotted line enclosure Q of FIG. 1 shows elements or parts of a PR11 or equivalent unit that may be used in carrying out the invention.

Referring particularly to FIG. 1, direct current voltage generated on the electrode 18 is amplified by an amplifier H and then passed through electrical leads 34 and 35 to a connector board or panel G. To provide a comparison circuit, 110 volts alternating current is reduced to 15 volts A.C. by a transformer E and is then passed through a rectifier F to provide 15 volts direct current that is also supplied to the board or panel G by leads 40 and 41. For visual indication of the concentration of the specimen solution, as designated either by percentage (as in a PR11 unit) or by some direct means such as voltage, a meter M is shown connected to the panel G by electrical leads 36 and 37, through a potentiometer I, and electrical leads 38 and 39. The potentiometer I may be employed to calibrate or to set the meter M for the operating range of voltage generated on the electrode 18.

Energy from the panel G is taken-off by electrical leads 42 and 43 and applied to energize a solenoid of a mini switch K through a control rheostat J and its lead 43a to move its switch arm to the shown "closed" position of FIG. 1 when the energy supplied to the panel G by the electrode 18 is less than that supplied by the lines 40, 41. The "closed" position is retained as long as the concentration of the specimen mixed solution fed to the flow block B is below a desired value. However, in this connection, the rheostat J may be employed to set the energization value which will cause the solenoid coil to maintain the switch K in its "closed" position. When the comparison energization applied by the electrical leads 34, 35 reaches a desired value which may be equal to the energy supplied by the leads 40, 41, the solenoid of the switch K will be de-energized and its spring 44 will return its contact or lever arm to an "open" position. Thus, when the solution in the tank $T_1$ again reaches a desired concentration, as indicated by the emf energization effected within the flow block B, this will produce a sufficient de-energization of the solenoid coil of the mini switch K to cause its tension spring 44 to move its arm to and retain it in an "open" position. In this manner, a desired concentration of sulfide in the solution being used in the treatment tank $T_1$ can be continuously and automatically maintained. Any suitable electrically sensitive fluid flow control means may be employed instead of the unit L. For example, if the sulfide solution source tank $T_2$ is located at a lower level than the treatment tank $T_1$, then a motor driven feed pump may be actuated by a solenoid switch in a conventional manner to move the solution from one tank to the other.

One side of the comparison circuit of the panel or board G may be energized by the leads 40 and 41 and the other side energized by the leads 31 and 37. Such circuit may then be employed to effect energization and de-energization of the solenoid of the mini switch K. When the switch K is closed, it energizes separately powered electrical circuit leads 46 and 47 to cause energization of the solenoid of control valve L to open it. This occurs when the voltage impressed on the electrode 18 is of a value which represents a low sulfide concentration of the mixed specimen solution. Flow from the tank $T_2$ will thus bring the sulfide content of tank $T_1$ up to the required value. At this time, the switch K closes to de-energize the circuit 46, 47 and cause the valve L to close. This represents one form of control for operating the valve L. However, any suitable means may be used which will function to cause a closing of the valve L when the emf applied to the sulfide electrode 18 indicates a proper sulfide concentration of the mixed specimen solution, and to cause the valve to open when the emf applied to the electrode 18 falls below a value which represents a lowered concentration of the sulfide solution in the tank $T_1$.

The reference electrode 19 has a constant known potential with negligible variation from one solution to another. It contains three compounds, namely, the actual reference internal half cell, usually either a silver/silver chloride or calomel (mercury/mercury chloride), a salt bridge electrolyte, and a small channel in its tip through which the salt bridge electrolyte flows very slowly and electrical contact is made with the solution in which the electrode is immersed in chamber 17.

If it necessary to control very high concentrations of sulfide of 1 to 10 g/l or more, dilution of the test specimen is accomplished to increase the sensitivity of the sulfide ion electrode for more accurate control. Thus, channel c and if necessary channel d of the peristaltic pump A may be used to accurately add dilution water as needed to the specimen solution being taken off continuously from the sulfide processing solution in the tank $T_1$. In this manner, sulfide concentrations over a very wide range of 1 ppm to 10 g/l and more can be monitored and controlled. The monitoring and control at any level in various industrial waters and waste solutions is made possible in accordance with the invention, unaffected by varying conditions of pH, temperature, ionic strength, etc., such as encountered in industrial situations. With reference to a comparison circuit, a Wheatstone bridge or any other suitable arrangement may be provided at the panel G.

In starting a calibrating operation, calibration of a percentage concentration meter M, such as present in a PR11 unit may be first accomplished. After an initial set-up of apparatus elements or units has been effected, a Y-shaped connector N (see FIG. 4) may be connected by input tubing 10 to the pump A. The first step is to insert one tubing leg 10' from the Y connector (designated as N) near the bottom of the sulfide treatment tank $T_1$, and insert another leg 9 within a plastic vessel or bottle P which may be a calibration plastic bottle containing a standardization solution. A pinch clamp or shut-off O may then be applied to the one leg 10' leading to the sulfide solution reaction tank $T_1$. Then, 2 ppm, 5 ppm and 10 ppm sulfide standard test or calibration solutions are prepared in separate vessels, such as represented by the plastic bottle or vessel P.

First, tubing leg 9 may be inserted in the 5 ppm bottle or vessel. Next, a second inlet tubing 11 is connected between the pump A and the vessel or tank $T_3$ containing the sulfide stabilizing solution. Such solution, for example, may be made up by weighing out 35 grams of ascorbic acid and placing it in a plastic one liter bottle, followed by the addition of 160 ml of 10 N caustic solution which has been diluted with one liter of de-ionized water. Three or four drops of hydrazine are then added to the plastic bottle and the solution shaken well. The solution is then added to a 10 liter hold tank and diluted to 5 liters. Note: this solution may be used continuously for about a day and should then be repreared.

To provide calibration where meter M represents percentage, 110 volts A.C. is applied to transformer H of the controller-amplifier unit (see FIG. 1) and the pump A and the stirrer C are energized. A motor start and stop button 26 for the stirrer is shown in FIG. 4. After the mixed solution from P and $T_3$ has purged through the flow block, the percentage dial for potentiometer I is adjusted (based on the use of the 5 ppm bottle) until the needle comes on scale to about 50%.

Where a PR11 unit is employed in a system of the invention, only the right hand sulfide control side is required. This side consists of an amplifier, "on" and "off" switches, flow indicating lights, and a percentage concentration meter. The meter can be calculated against known sulfide concentration standards to yield a graph that converts percentage into actual sulfide concentration.

Next, using the 2 ppm sulfide solution bottle P will cause the needle to deflect downwardly to about a 25% position, and the use of the 10 ppm test solution bottle will then deflect the needle upward to about a 60% position. A graph may then be prepared of percentage reading vs. sulfide concentration and any concentration of sulfide between 2 and 10 ppm will then be indicated. If, instead of a percentage meter, a millivolt meter is used, such a meter may be provided with a scale which will directly read in ppm sulfide or g/l of sulfide. After a suitable calibration has been effected, the Y may be removed and the tubing or piping 10 directly inserted in the treatment tank $T_1$. At this time, the tubing 11 will be in place within the stabilization tank $T_3$ and the tubing 12 disconnected or a clip may be applied to it if no diluting water is needed. In FIG. 4, the pump A, the flow block B, the magnetic stirrer C and a 110 volt alternating current supply terminal box R are shown mounted on a panel or board that is secured on the rim of the treatment tank $T_1$ to provide a compact assembly.

I claim:

1. A process for constantly maintaining a desired concentration of soluble sulfides in a processing solution such as in an effluent or rinse water containing heavy metal contaminants to be removed which comprises, continuously withdrawing a specimen solution from the sulfide processing solution and mixing it with a sulfide stabilizing solution to provide a mixed specimen solution, employing the mixed specimen solution to proportionately energize a pair of electrodes in accordance with the soluble sulfide content of the mixed specimen solution, and employing the energy thus generated to controllably supply sulfide regenerating solution to the processing solution to maintain the soluble sulfide content thereof.

2. A process as defined in claim 1 wherein the energization of the electrode is in the form of an electric voltage impressed on one of the electrodes that is proportional to the soluble sulfide content of the mixed specimen solution being applied thereto.

3. A process as defined in claim 1 wherein, one of the electrodes is a sulfide electrode and the other is a reference electrode, the reference electrode has a substantially constant potential imparted thereto and the sulfide electrode has a varying potential imparted thereto which is proportional to the sulfide concentration of the mixed specimens solution being applied thereto.

4. A process as defined in claim 1 wherein the electric energy generated on the electrodes is amplified and compared with a fixed predetermined standard of electrical energy in such a manner as to control the flow of sulfide regenerating solution by a comparative application of the separate source of energy with the amplified energy supplied by the electrodes.

5. A method as defined in claim 4 wherein, the specimen sulfide processing solution and the sulfide stabilizing solution are drawn-off and mixed in a substantially equally proportioned relation with respect to each other to provide the mixed specimen solution that is applied to the electrodes, and the mixed specimen solution after being applied to the electrodes is returned to the processing solution.

6. A process as defined in claim 5 wherein, the specimen processing solution and the stabilizing solution are mixed magnetically before being applied to the electrodes, and the mixed specimen solution is pumped hydrostatically in its movement to and from the electrodes.

7. A process as defined in claim 1 wherein, the electric potential generated by the electrodes is continuously employed to maintain the desired concentration of soluble sulfide in the processing solution by continuously-automatically introducing the sulfide regenerating solution into the processing solution when the concentration of the sulfide processing solution falls below the desired value and shutting off the introduction of the sulfide rengeneration solution when the concentration of the sulfide processing solution reaches the desired value.

8. A process as defined in claim 1 wherein, the sulfide stabilizing solution consists of about 7 g/l of ascorbic acid, about 8 g/l of sodium hydroxide and about 0.1 ml/l of hydrazine hydrate of about a 64% concentration.

9. A process as defined in claim 1 wherein, the concentration of the soluble sulfide therein is above about 32 g/l, and diluting water is mixed with the sulfide specimen solution and the sulfide stabilizing solution to bring its concentration of the soluble sulfide down to below about 32 g/l before the mixed specimen solution is applied to the electrodes.

10. A process as defined in claim 1 wherein the sulfide concentration to be maintained in the sulfide processing solution is within a range of about 0.5 to 50 ppm.

11. A process as defined in claim 1 wherein, the sulfide concentration to be maintained in the processing solution is above about 50 ppm, and the mixed specimen solution is diluted with water sufficiently to bring the concentration of the solution to a value of 50 ppm or lower.

12. A process as defined in claim 1 wherein a relatively small amount of processing solution is continuously extracted and mixed with a quantity of stabilizing solution sufficient to maintain a substantially constant pH and ionic strength in the mixed specimen solution that is applied to the electrodes.

13. A process for measuring and constantly maintaining a desired concentration of soluble sulfides in a processing solution for the purpose of maintaining the function of said processing solution by supplying sulfide regenerating solution thereto in accordance with requirements thereof which comprises: withdrawing fluid from the processing solution and from a sulfide stabilizing solution and mixing them in a proportioned relation, moving the mixed fluid solution through a chamber in a flow block having a reference electrode and a sulfide electrode therein to thereby energize the electrodes, maintaining a selected rate of withdrawal of fluid from the processing solution and a selectively proportioned mixing of the stabilizing solution therewith, amplifying the electrical potential difference between energy outputs from the sulfide and reference electrodes, and employing the resultant electrical energy to automatically control the amount of sulfide regenerating solution supplied to the processing solution to maintain a desired soluble sulfide concentration thereof.

14. A process according to claim 13 wherein the processing solution is an effluent or rinse water which contains heavy metal contaminants, and the soluble sulfide in the processing solution is employed to remove heavy metal contaminants therefrom.

15. A processing system for measuring and constantly maintaining a desired concentration of soluble sulfides in a processing solution for the purpose of maintaining the function of said processing solution which comprises: a stock sulfide solution, a sulfide stabilizing solution, a supply line connected from said stock sulfide solution to the processing solution, flow control means in said supply line for controlling fluid flow from said stock solution to the processing solution, a flow block having a reference electrode and a sulfide electrode projecting therein; means for withdrawing specimen solution from the processing solution and from said sulfide stabilizing solution, mixing them in a proportioned relation, and flowing the mixed specimen solution through said flow block; said flow block being adapted to energize said electrodes and said sulfide electrode proportionally to the sulfide ion concentration of the mixed specimen solution being flowed therethrough, a controller amplifier, means for applying energy generated on said electrodes within said flow block to said controller amplifier, said withdrawing and mixing means being adapted to introduce the mixed specimen solution into said flow block in such a manner as to maintain a selected rate of withdrawal from the processing solution and a selectively proportioned withdrawal and mixing of said stabilizing solution therewith, said controller amplifier being adapted to amplify a voltage differential between voltages generated on the sulfide and reference electrodes, and flow control means electrically operated and sensitive to variations of energy imparted by said controller-amplifier for automatically controlling the amount of stock sulfide solution passing through said supply line to the processing solution in accordance with the energization of said sulfide electrode by the mixed specimen solution.

16. A processing system as defined in claim 15 wherein said means for withdrawing the specimen and the stabilizing solutions, for mixing them and flowing the mixed specimen solution through the flow block comprises a peristaltic pump and a magnetic mixer.

* * * * *